US012697881B2

(12) United States Patent
Strashny et al.

(10) Patent No.: US 12,697,881 B2
(45) Date of Patent: Aug. 4, 2026

(54) PIVOTING BOOM STRUCTURE FOR DYNAMIC ENERGY TRANSFER SYSTEM

(71) Applicant: Caterpillar Inc., Peoria, IL (US)

(72) Inventors: Igor Strashny, Tucson, AZ (US); Jason Schafer, Rapid City, SD (US); Paul Ives, Twin Lake, MI (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 18/524,892

(22) Filed: Nov. 30, 2023

(65) Prior Publication Data

US 2025/0178443 A1     Jun. 5, 2025

(51) Int. Cl.
*B60L 5/38* (2006.01)

(52) U.S. Cl.
CPC ............. *B60L 5/38* (2013.01); *B60L 2200/36* (2013.01)

(58) Field of Classification Search
CPC ...... B60L 5/00; B60L 5/18; B60L 5/20; B60L 5/38; B60L 2200/36
See application file for complete search history.

(56) References Cited

U.S. PATENT DOCUMENTS

| | | | |
|---|---|---|---|
| 3,786,762 A | | 1/1974 | Corkum et al. |
| 4,155,434 A | * | 5/1979 | Howell, Jr. .............. B60M 1/30 |
| | | | 104/246 |
| 4,234,065 A | * | 11/1980 | Uozumi .................... B60L 5/36 |
| | | | 191/29 R |
| 5,528,901 A | * | 6/1996 | Willis ........................ F02N 7/08 |
| | | | 123/142.5 R |
| 11,565,590 B2 | | 1/2023 | Geoffroy |
| 2017/0166084 A1 | | 6/2017 | Tajima |
| 2017/0326988 A1 | | 11/2017 | Maier et al. |
| 2021/0188095 A1 | * | 6/2021 | Wolff ...................... B60L 5/005 |
| 2022/0297574 A1 | * | 9/2022 | Forestier ................... B60L 9/04 |
| 2023/0090618 A1 | | 3/2023 | De Buretel De Chassey et al. |
| 2023/0163526 A1 | * | 5/2023 | Strashny ................... B60L 5/32 |
| | | | 439/34 |
| 2023/0231350 A1 | * | 7/2023 | Strashsny ............... B60L 5/085 |
| | | | 191/45 R |

FOREIGN PATENT DOCUMENTS

| | | |
|---|---|---|
| CN | 210792806 U | 6/2020 |
| EP | 4257411 A1 | 10/2023 |
| WO | 2019158846 A1 | 8/2019 |
| WO | 2021173988 A1 | 9/2021 |
| WO | 2022174896 A1 | 8/2022 |

* cited by examiner

*Primary Examiner* — Robert J McCarry, Jr.
(74) *Attorney, Agent, or Firm* — Bookoff McAndrews PLLC

(57) ABSTRACT

A pivoting boom includes a housing pivotally attached to a frame of a mobile machine at a pivot point at a proximal end of the housing and a busbar assembly attached to an interior surface of the housing and configured to electrically connect the mobile machine to the electrically-conducting rail system via a plurality of electrical cables in the busbar assembly. A pivoting boom also includes a hydraulic system configured to extend or retract the pivoting boom about the pivot point and a pneumatic system configured to control the movement of a trailing arm assembly and a contactor assembly.

20 Claims, 6 Drawing Sheets

PIVOTING BOOM STRUCTURE FOR DYNAMIC ENERGY TRANSFER SYSTEM

TECHNICAL FIELD

The present disclosure relates generally to a boom structure for a mobile machine, and more specifically, to a pivoting boom for connecting an electrically-powered machine to an electrically-conducting rail system.

BACKGROUND

Mobile industrial machines, such as earth-moving machines, can be of substantial weight and can bear immense loads, thus requiring a significant amount of power. Many industrial machines are driven by internal combustion engines. However, internal combustion engines have drawbacks in the form of fuel costs, fuel transport difficulties, and detrimental engine emissions. Accordingly, there has been a movement toward powering large mobile industrial machines with hybrid or all-electric power systems.

While hybrid and all-electric power systems for industrial machines are beneficial for alleviating fuel costs and emission concerns, these systems present unique challenges. For example, the use of hybrid or all-electric systems in an industrial capacity requires a significant investment in infrastructure, particularly due to the location of industrial worksites. While the use of overhead electricity-conducting rails has been one solution for powering vehicles with predetermined routes or terrain (e.g., trains, subways, buses, etc.), freely-steerable industrial machines and worksites with uneven terrain present hurdles. As a result, existing powered systems, such as overhead trolleys, are not typically used in remote and uneven environments.

Other problems include the ability to safely generate and conduct electricity while ensuring safety. As industrial machine routes may frequently change due to project needs, it is important for the machine systems to securely conduct power to the mobile machine. It is also beneficial for the industrial machine to have control systems with the ability to quickly deploy or retract the connector assembly.

An electric delivery system for providing electric power to a traveling vehicle is disclosed in International Patent App. Pub. No. WO 2020/186296 A1, published on Sep. 24, 2020 ("the '296 publication"). The '296 publication describes an electric delivery system at a mine site for a moving vehicle where two conductors are anchored to relocatable roadside barriers. In order to charge the moving vehicle, the delivery system requires that a retractable arm precisely engage with electrical connectors embedded within a horizontal channel of the roadside barriers.

Aspects of the present disclosure may solve one or more of the problems set forth above and/or other problems in the art. The scope of the current disclosure, however, is defined by the attached claims, and not by the ability to solve any specific problem.

SUMMARY

In one aspect, a boom for connecting a mobile machine to an electrically-conducting rail system may include a housing pivotally attached to a frame of the mobile machine at a pivot point at a proximal end of the housing and a busbar assembly attached to an interior surface of the housing and configured to be connected to a plurality of electrical cables that electrically connect the mobile machine to the electrically-conducting rail system via the busbar assembly. The boom may also include a hydraulic system with a hydraulic power unit, a hydraulic cylinder and a hydraulic manifold; and a pneumatic system within the housing.

In another aspect, an electrical power supply system may include an electrically-powered mobile machine and a boom for electrically connecting the electrically-powered mobile machine to an electrically-conducting rail system. The boom may include a boom housing defining an interior, a first busbar, and a second busbar. The first busbar and the second busbar are spaced apart by a plurality of housing connectors that couple the first busbar and the second busbar to the interior of the boom housing. The boom may also include a plurality of electrical cables, the plurality of electrical cables each including a connection pin connected to the first busbar and the second busbar.

In yet another aspect, a boom fluid system may include an electronic control module; a hydraulic system with a hydraulic power unit, a hydraulic manifold, and a hydraulic cylinder connected at a proximal end to a frame of a mobile machine and to an external boom housing at a distal end; and a pneumatic system with a filter, a compressor, a dryer, a pneumatic tank, and a pneumatic valve. The electronic control module may monitor and control pressure generated by the hydraulic system and the pneumatic system.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
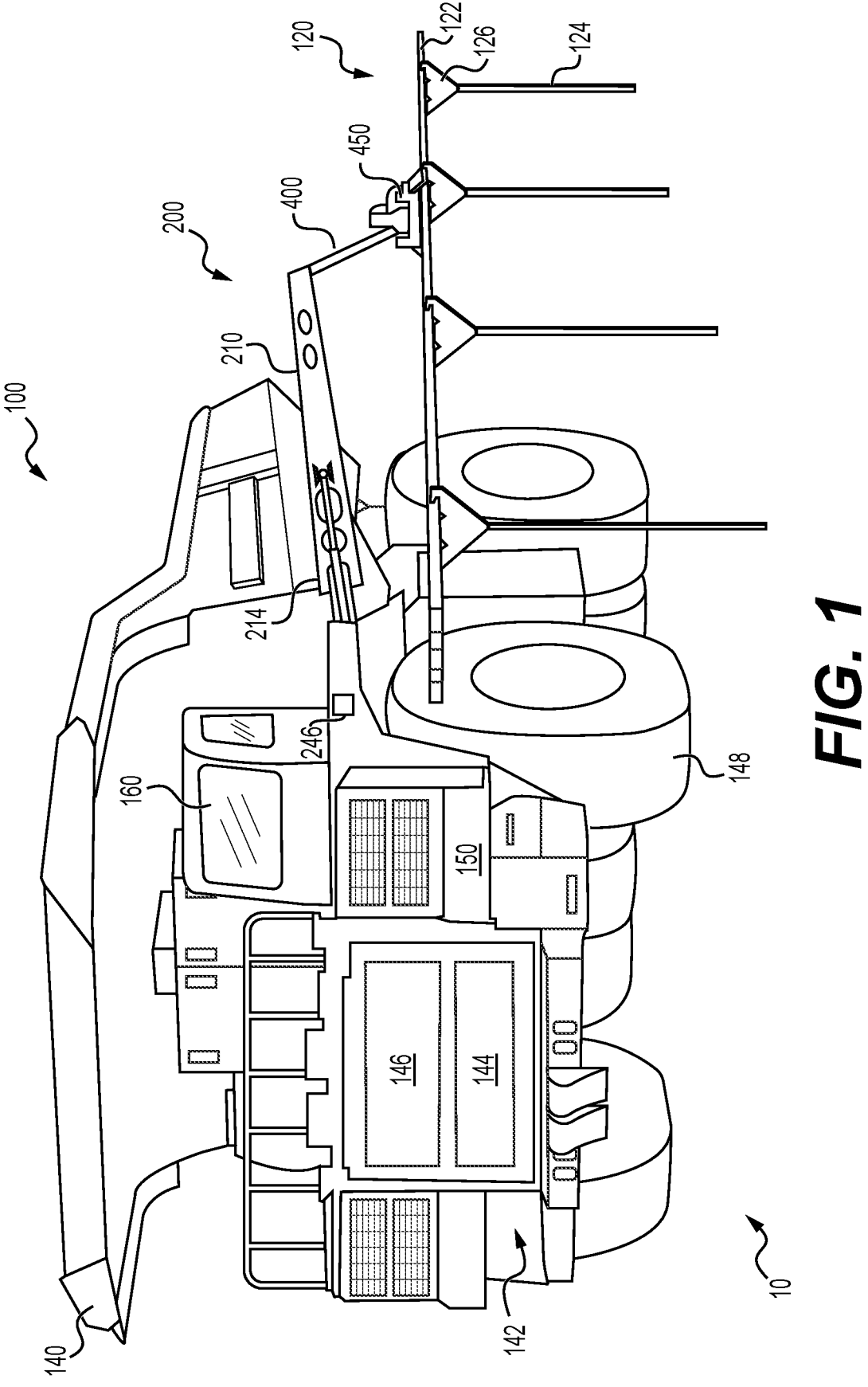
FIG. 1 is a perspective view of an electric mobile machine connected to a conducting rail power source using a rail connector assembly with a pivoting boom, according to aspects of the present disclosure.

FIG. 1 depicts a mobile machine power system 100, according to aspects of the present disclosure. The mobile machine power system 100 includes an electrically-conducting rail system 120 and a mobile machine 140. The electrically-conducting rail system 120 includes a plurality of conductor rails 122 connected to a power-generating source (e.g., a power grid, generator, and/or energy storage devices), a plurality of support poles 124 secured to the ground 10, and a bracket assembly 126 attached to a top end of the each of the support poles 124 to retain the plurality of conducting rails 122 in a secured elevated position.

While FIG. 1 shows an example where the plurality of conductor rails 122 contains three conductor rails, the plurality of conductor rails 122 may contain fewer or more rails. In this example, two of the conductor rails provide electrical power at different polarities while the third conductor rail provides a reference of 0 volts. The electrically conducting rail system may alternatively incorporate a three-phase power system, utilizing a three-rail power circuit in addition to a fourth conductor rail providing a reference of 0 volts.

The plurality of support poles 124 ground the electrically-conducting rail system 120, specifically contacting the conductor rail to provide the reference of 0 volts. Individual support poles 124 may be rods, poles, posts, cylinders, stanchions, or similar structures and have a length for elevating and supporting the plurality of conductor rails 122. The plurality of support poles 124 have a length sufficient to support and stabilize the plurality of conducting rails 120 at a height of at least eight feet above the ground, for example. The support poles 124 are made of dielectric materials such as pultruded fiberglass-reinforced polymer (FRP), or other electrically insulating or dielectric materials.

When in operation, the mobile machine 140 and its various systems are controlled via a machine operator located in the operator cabin 160. If desired, mobile machine 140 is semi- or fully-autonomous or remotely operated. The mobile machine 140 is free-steering and includes an electric drive system 142 having at least one electric motor 144 and at least one battery system 146. The electric drive system 142 moves a set of ground-engaging elements 148, such as tires or continuous tracks, for propelling and maneuvering the mobile machine. The mobile machine 140 also includes a frame 150 which supports the mobile machine's mechanical components, including a rail connector assembly 200 that connects to the electrically-conducting rail system 120 and transfers electrical energy to the mobile machine 140. Mobile machine 140 may utilize either hybrid or all-electric power systems, and the electrically-conducting rail system 120 may be applied to either system.

As shown in FIG. 1, the exemplary mobile machine 140 travels along a work route or path, with the electrically-conducting rail system 120 positioned along a route or path parallel to the defined work route. The mobile machine 140 is shown in the context of a mining truck, and the work route or path may lead from a mining source to another destination within the worksite. The present disclosure is not thereby limited, however, and other types of machines are within the scope of the present disclosure, including articulated trucks, asphalt pavers, backhoe loaders, cold planers, compactors, dozers, draglines, drills, rope shovels, excavators, forest machines, hydraulic mining shovels, material handlers, motor graders, off-highway trucks, pipelayers, road reclaimers, skid steer and compact track loaders, telehandlers, track loaders, underground mining dump loaders and trucks, wheel loaders, wheel tractor-scrapers, or other machines.

Figure 2:
FIG. 2 is a perspective view of the extended connector assembly connected to a plurality of conductor rails.

As shown in FIG. 2, the rail connector assembly 200 is controlled by an operator to electrically connect the mobile machine 140 to the electrically-conducting rail system 120. To that end, the rail connector assembly 200 includes a pivoting boom 210 ("boom"), a trailing arm assembly 400, and a contactor assembly 450. The boom 210 includes a housing 212, as well as a hydraulic system 220, a pneumatic system 260, and a busbar assembly 280, each of which are located partially or entirely within the housing 212 and shown in FIGS. 3 and 4. The boom 210 is attached to a side surface of the frame 150 to pivot about a pivot joint 214. While the boom 210 is shown to be attached to a mining haul truck, the boom 210 is capable of being incorporated in various types of mobile machines 140 by use of an interchangeable adapter 310 that is specific to the type of machine being operated.

Figure 3:
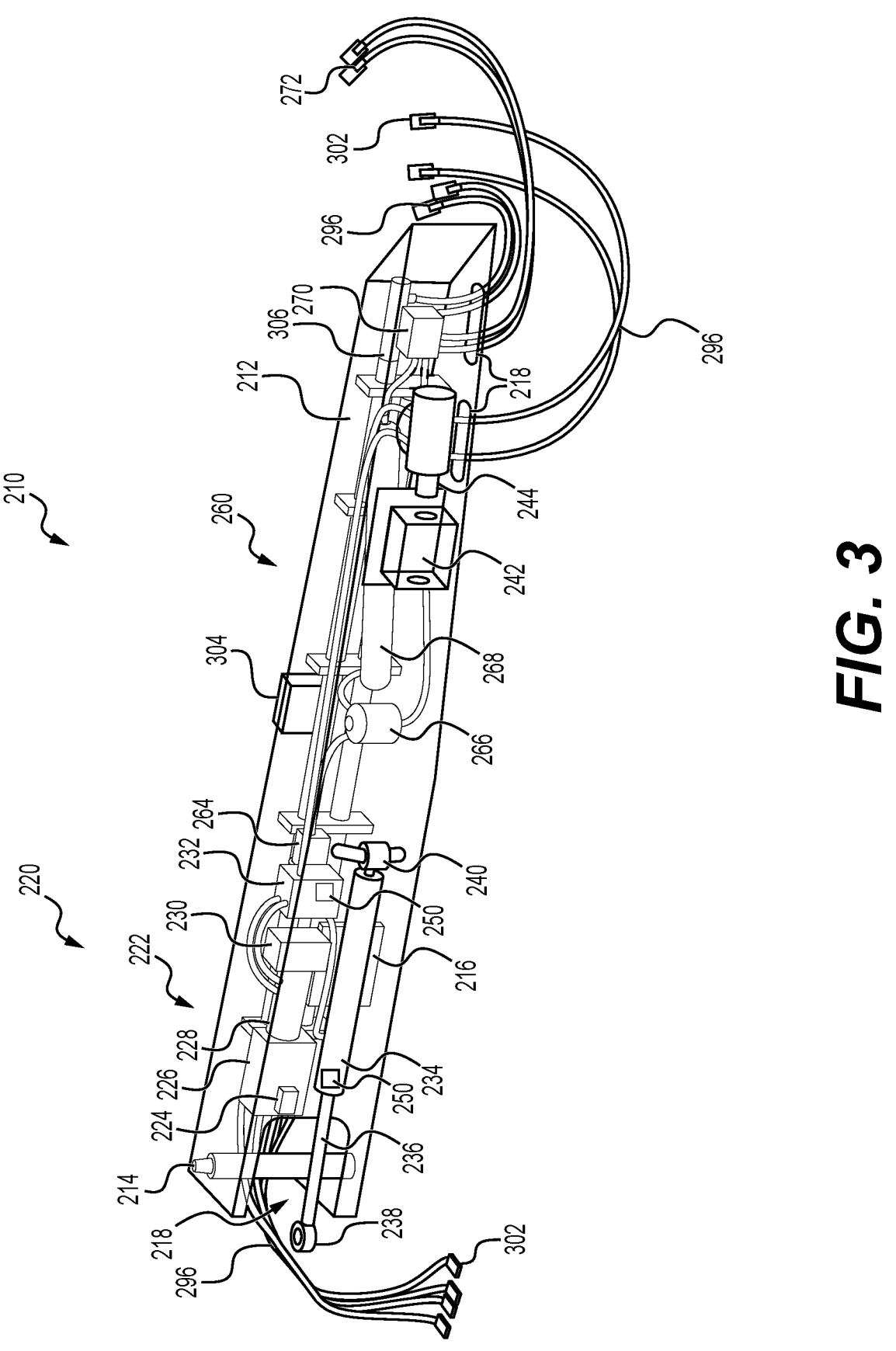
FIG. 3 is a perspective view of a rear of the pivoting boom.
Figure 4:
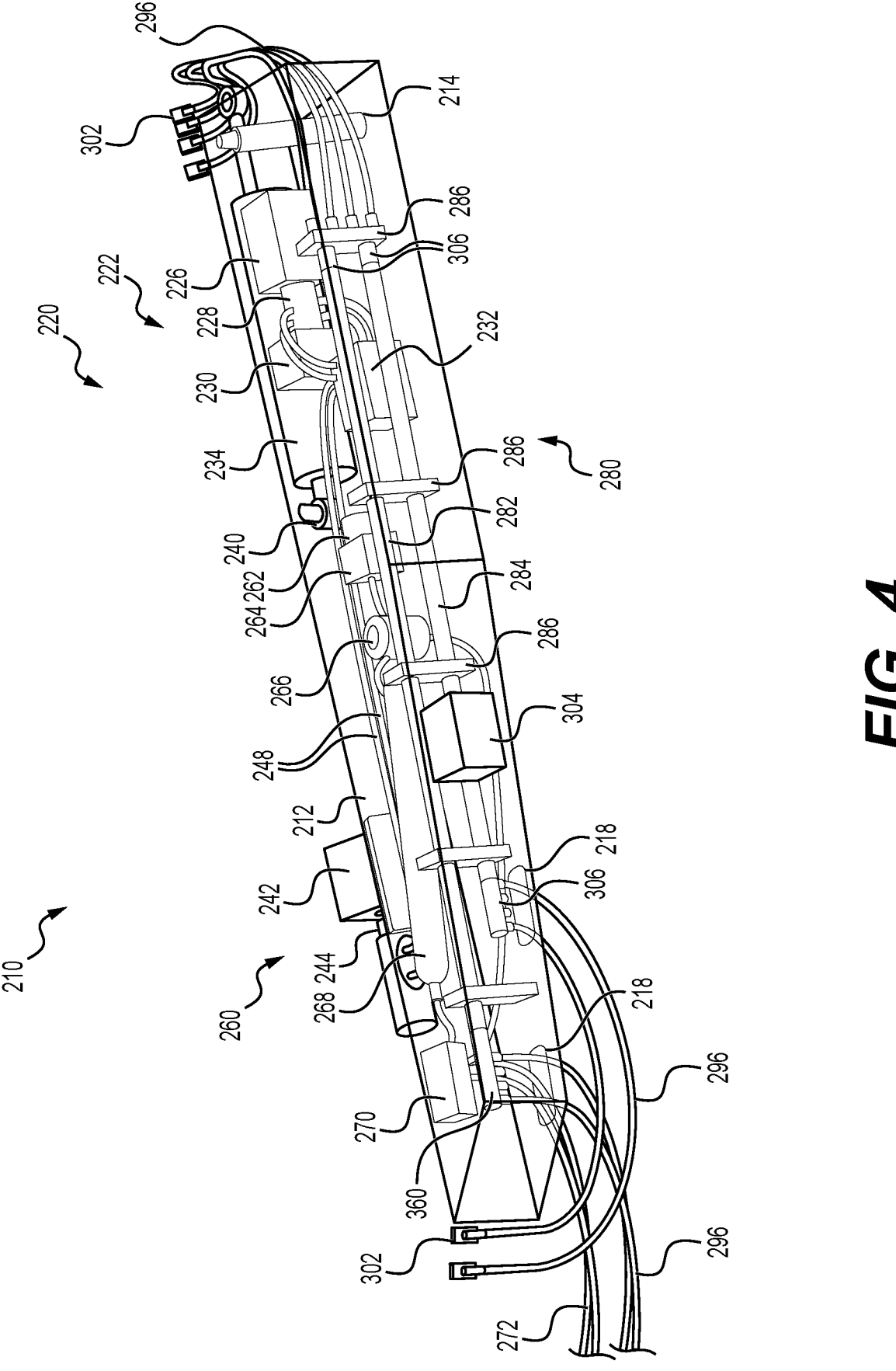
FIG. 4 is a perspective view of a front of the pivoting boom.

In addition to systems located in the interior of the housing 212, hardware may be attached to the exterior of the housing 212. For example, FIG. 3 shows a locking pin 244, and FIG. 4 shows a proximity sensor (e.g., a radar array) 304 for sensing the proximity of foreign objects in relation to the boom. Furthermore, the boom 210 includes several different states for deployment and non-deployment. These states include an extended state (shown in FIG. 2) in which the boom 210 is extended outward from the mobile machine 140 in a horizontal direction, a retracted state in which the boom is drawn inward to rest against the frame 150 of the mobile machine, and a locked state in which the boom is locked to the side of the frame in the retracted position by the locking pin 244 (FIG. 3).

As shown in FIGS. 3 and 4, the boom 210 includes a housing 212, which provides protection to the internal components of the boom 210. The housing 212 may be substantially rectangular and fabricated from a metal material (e.g., steel), while other suitable materials may be used. The housing 212 also includes a plurality of maintenance openings 218 (also shown in FIG. 2) located along the length of the boom. The maintenance openings 218 allow for easy access to the internal systems of the boom 210 without the need to completely detach the boom 210 from the mobile machine 140. For example, the maintenance openings 218 allow for an operator or a mechanic to replace components of the hydraulic system 220 or the pneumatic system 260, and also ensure the proper connection of the busbar assembly 280 within the boom 210.

The interior of housing 212 includes an electronic control module ("ECM") 216, a hydraulic system 220, a pneumatic system 260, and one or more busbars 282, 284. The ECM 216 is an embedded system within the boom 210, in which the ECM 216 receives signals from the mobile machine 140 and the sensors within the rail connector assembly 200, and generates commands to the various components of the rail connector assembly. For example, in the case of initiating either the hydraulic system 220 or the pneumatic system 260, the ECM generates an actuation command (e.g., electronic signals) to the hydraulic system or sends an actuation command to the components of the pneumatic system.

Turning to the hydraulic system 220, system 220 controls the extension and retraction of the boom 210 outward from the mobile machine 140 about the pivot joint 214 and along a horizontal direction. As shown in FIG. 3, the hydraulic system 220 comprises a hydraulic power unit ("HPU") 222, a hydraulic manifold 232, a hydraulic cylinder 234, and a plurality of hydraulic tubes 248 to interconnect the components of the hydraulic system 220. The HPU 222 pressurizes a fluid, and includes a fluid reservoir 226, a hydraulic pump 228, and a motor 230. An angular position or angle sensor 224 may be included as part of the hydraulic system 220 to provide a reference of the location of the boom 210 to the ECM 216, allowing ECM 216 to control HPU 222 based on signals from the sensor 224. Together, the components that comprise the HPU 222 deliver the pressurized fluid to the hydraulic manifold 232 through a pair of hydraulic tubes 248 (FIG. 4). The hydraulic manifold 232, which regulates the flow of the pressurized fluid within the hydraulic system, distributes the pressurized fluid (via hydraulic tubes 248) to (or from) either the hydraulic cylinder 234 or to the locking pin 244.

When transitioning the boom 210 from a retracted state to an extended state, the hydraulic cylinder 234 extends to pivot the boom outward so that the boom is approximately perpendicular to a side surface of the frame 150 of the mobile machine. The hydraulic cylinder 234, as shown in FIG. 3, has a first end that is connected (via a frame connector 238) to the frame 150 of the mobile machine 140. The hydraulic cylinder 234 has a second end that is connected (via a housing connector 240) to an exterior surface of the housing 212 of the boom 210. The hydraulic cylinder 234 also includes an actuation rod 236, which moves outward or inward based on the commands provided by the ECM 216.

As shown in FIG. 3, boom 210 may also include a lock receptacle 242 for use with the locking pin 244. The lock receptacle 242 is attached to a front exterior surface of the housing 212 and defines a recessed space for receiving a lock portion of the frame 150. The lock receptacle 242 also includes a through hole for receiving and guiding the locking pin 244, such that locking pin 244, when extended, is received through locking receptacle 242 and the portion of the frame 150 in the recessed space. The portion of the frame 150 that is received by receptacle 242 may include a hole that is aligned with the hole of receptacle 242 that receives pin 244.

A locking sensor 246 (FIGS. 1 and 2) is attached to the frame 150 and provides proximity information relating to the distance of the boom 210 to the frame 150 to the ECM 216. When the boom 210 is in close proximity to the frame 150 (e.g., in contact with a recess of frame 150 shaped to receive the boom 210), the ECM 216 generates a locking command to the hydraulic system 220 to actuate the locking pin 244. The locking pin 244 is hydraulically connected to the hydraulic manifold 232 by an individual hydraulic tube 248, thereby actuating the locking pin 244, through the lock receptacle 242, to retain the boom 210 against the frame 150 of the mobile machine. When ECM 216 generates an unlock command, the locking pin 244 is actuated to an open or free position shown in FIG. 3, allowing the boom 210 to be moved or manipulated by an operator. The process of actuating the locking pin 244 may be initiated by the operator or may be automated based on data obtained by the ECM 216.

The hydraulic system 220 may also include a plurality of system state sensors 250 to provide position, pressure (e.g., of hydraulic fluid for system 220), and angle data to the ECM 216, which may in turn correspond to control of the hydraulic components housed within the boom, the actuation of hydraulic cylinder, and the rotational movement of the boom. For example, the system state sensors 250 are attached to components, such as the hydraulic cylinder 234 and the hydraulic manifold 232, or hoses for supplying fluid to these components (not shown), in order to obtain data concerning the pressure levels in those structures. In some aspects, the ECM 216 monitors the pressure level data, calculates any changes that are necessary to transition between the various states, and generates commands to the hydraulic system accordingly. This may include commands that result in the actuation of the locking pin 244 or of the hydraulic cylinder 234.

The pneumatic system 260 controls the movement of the trailing arm assembly 400 and the contactor assembly 450 (FIGS. 1 and 2). With reference to FIG. 4, the pneumatic system 260 includes a filter 262, a compressor 264, a dryer 266, a pneumatic tank 268, and a pneumatic valve 270. The components of the pneumatic system 260 are fluidly interconnected by a plurality of pneumatic tubes 272, allowing for the transfer of fluid within the system. While compressed air can be utilized in the pneumatic system, other suitable gases capable of being pressurized may be alternatively used.

The filter 262 is directly connected to the compressor 264 to prevent foreign particulate matter from entering the pneumatic system. The compressor 264 pressurizes the system gas, which is transferred to the dryer 266 for the removal of moisture. The dryer 266 is connected to the pneumatic tank 268 by a first pneumatic tube and to the pneumatic valve 270 by a second pneumatic tube. The pneumatic tank 268 is also fluidly connected to the pneumatic valve 270 and acts as a storage unit for the pressurized gas until released via the valve 270.

FIG. 4 further illustrates a pair of pneumatic tubes 272 connected to the pneumatic valve 270 at a distal end of the boom 210. Once released by the valve 270, the pressurized gas is carried by the pair of pneumatic tubes 272 to the trailing arm assembly 400 and the contactor assembly 450 (FIGS. 1 and 2), thereby regulating the pressure downstream within the rail connector assembly 200. This regulation of downstream pressure may include pneumatically extending or retracting the trailing arm assembly 400 or actuating extendible brushes in the contactor assembly 450 to disengage from the plurality of conductor rails 122.

The busbar assembly 280, as shown in FIGS. 3 and 4, includes a first busbar 282, a second busbar 284, and a plurality of housing connectors 286. The busbar assembly 280 is electrically connected to the mobile machine 140 at a proximal end of the boom 210 (via a first set of electrical cables 296) and to the trailing arm assembly 400 at a distal end of the boom (via a second set of electrical cables 296). With this electrical connection, electrical energy is routed from the contactor assembly 450 to the trailing arm assembly 400, along the length of the first and second busbars 282, 284, to the mobile machine 140. In order to conduct the electrical energy, each busbar 282, 284 includes a conductive end portion 306 located at either end of the respective busbar. Between each conductive portion 306, an exterior surface of the remaining length of each busbar 282, 284 includes an insulated coating (e.g., an anodized finish) that covers the conductive interior of the busbar 282, 284. The conductive material of busbars 282, 284 may be an aluminum material or a copper material, but may be made of other suitable materials.

FIGS. 3-6 depict a first busbar 282, a second busbar 284, the plurality of housing connectors 286, and a plurality of busbar connection assemblies 288. The first busbar 282 (e.g., a generally cylindrically-shaped device) and the second busbar tube 284 (e.g., also a generally cylindrically-shaped device), as shown in FIG. 4, are parallel to each other along the length of the boom and are designed to carry different electrical polarities. For example, the first busbar 282 is attached to electrical cables 296 that carry a positive electrical charge and the second busbar 284 is attached to electrical cables that carry a negative electrical charge. The plurality of housing connectors 286 are equally distributed along the lengths of the first busbar 282 and the second busbar 284 as shown in FIG. 4, thereby maintaining the parallel spacing between the busbars.

Figures 5, 6:
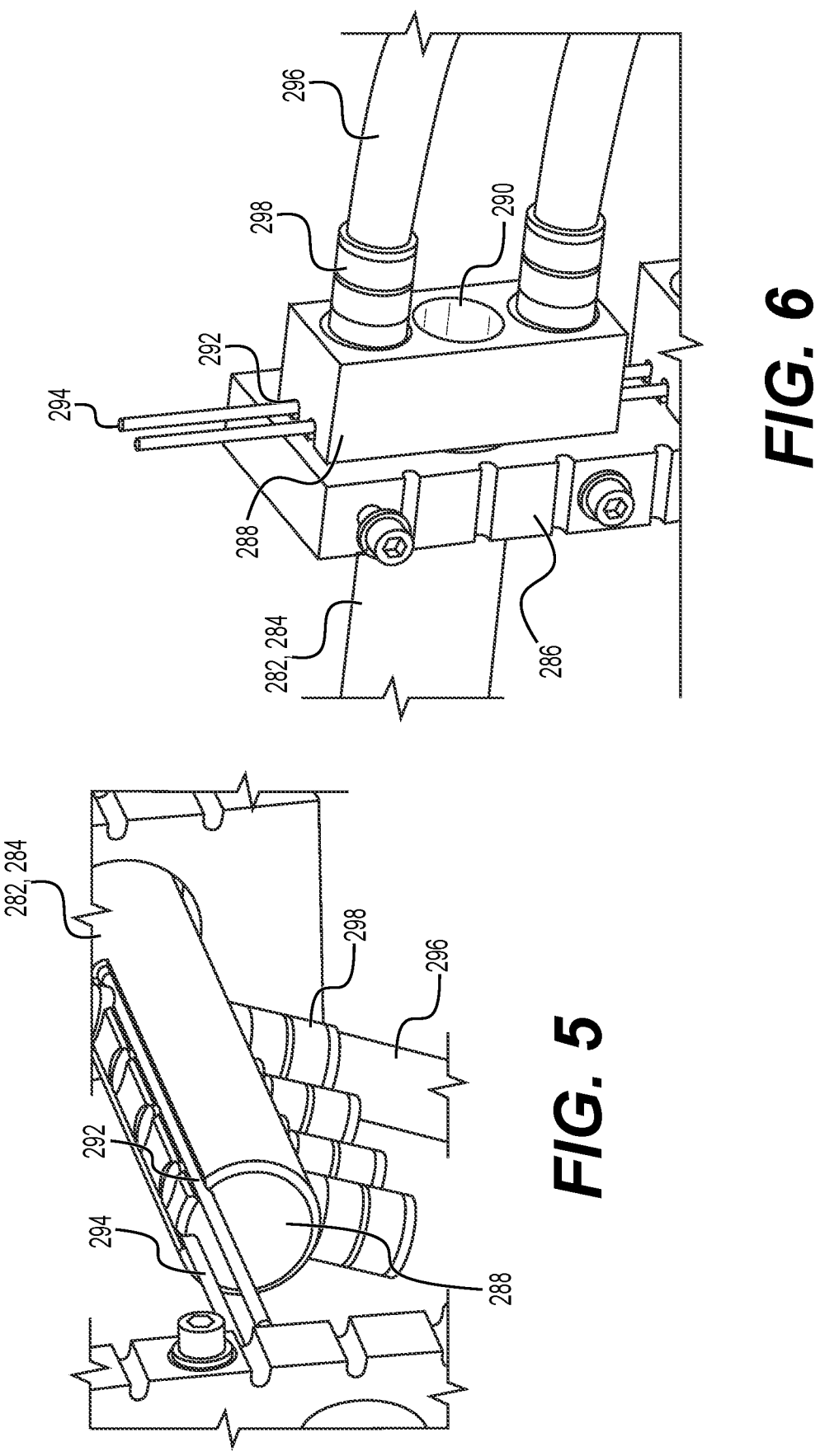
FIG. 5 is a perspective view of a busbar connection assembly at a distal end of a busbar, according to aspects of the present disclosure.
FIG. 6 is a perspective view of a busbar connection assembly at a proximal end of a busbar.

As shown in FIGS. 5 and 6, each busbar 282, 284 includes a pair of busbar connection assemblies 288 for connecting the electrical cables 296 to the busbars 282, 284. A first busbar connection assembly 288 (FIG. 5) is formed at a distal end of the busbar 282 (adjacent to the trailing arm assembly 400). A second busbar connection assembly 288 (FIG. 6) is attached to an end of the busbar 284 and to a housing connector 286 (proximal to the mobile machine 140). Each busbar connection assembly 288 includes a plurality of bore openings 290 configured to connect electrical cables 296 to the busbar assembly 280. The busbar connection assemblies 288 also include a pair of retention slots 292 configured to receive retention rods 294 that secure the connection pins 298 within the busbar connection assembly, as described below.

The electrical cables 296 each include an individual connection pin 298, located at an end of the electrical cable 296, and an end connector 302 (FIG. 3) located at a distal end of the electrical cable. To connect each individual cable 296 to the connection pin 298, the pin 298 is mechanically crimped onto the end of the cable. Each connection pin 298 is also inserted into a bore opening 290, which is configured to receive the connection pin 298 in a mating relationship.

Figure 7:
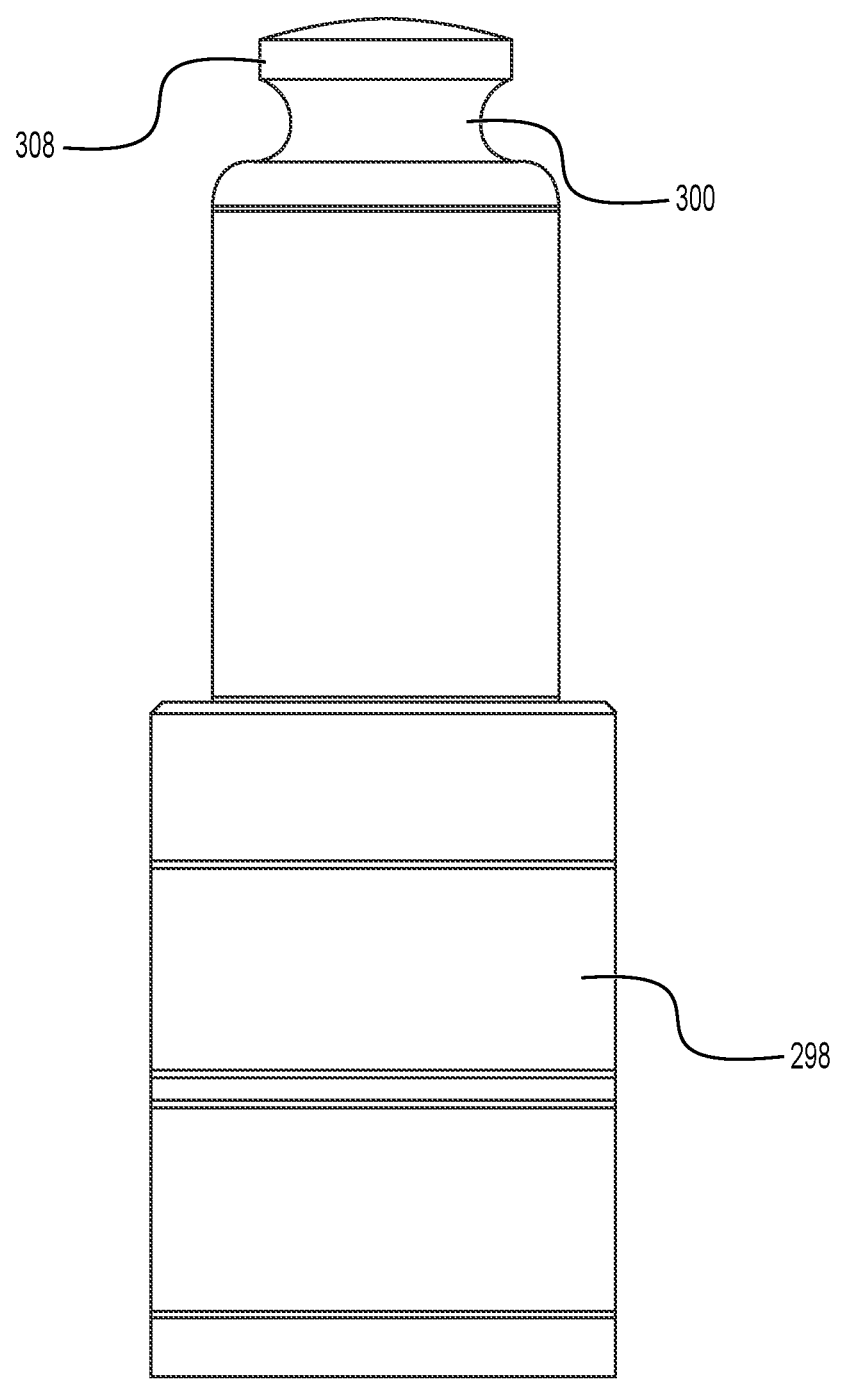
FIG. 7 is a front view of a pin useful with a busbar connection assembly.

As shown in FIG. 7, each connection pin 298 includes a recessed (e.g., filleted) distal end 300 with a rounded head 308. The recessed portion of the distal end 300 is narrower than an outer diameter of the rounded head 308 and capable of receiving a retention rod 294 at any point along its circumference. When inserted into the individual bore opening 290 of the busbar connection assembly 288, the proximal pin is sized such that the filleted distal end 300 aligns with the pair of retention slots 292 found within each busbar connection assembly.

The distal end 300 is shaped such that, when a pair of frangible retention rods 294 are inserted into the retention slots 292, the retention rods 294 are received within the recess of the distal end, thereby supporting the pin within the assembly. The frangible retention rods 294 are made of either a plastic or metal material, and are designed so that, when exposed to large forces, the retention rods fracture along pre-determined points of breakage. This fracturing allows the electrical cables 296 to quickly disengage (e.g., fall due to gravity) from the busbar assembly 280 and electrically disconnect from busbar 282 or 284, thereby improving safety. It should be noted that, as shown in FIGS. 5 and 6, each busbar can be connected to four (or more) electrical cables 296 for redundancy, with at least a pair of electrical cables being connected to the first busbar connection assembly 288 at the distal end of the busbar and at least a pair of electrical cables being connected to the second busbar connection assembly at the proximal end of the busbar.

INDUSTRIAL APPLICABILITY

The disclosed aspects of the pivoting boom above can be used for deploying a rail connector assembly and charging a moving free-steering machine with an electrically-conducting rail system on an industrial worksite. For example, the drawings generally depict the boom and the systems located within a fabricated housing, including a hydraulic system for extending and retracting the boom, a pneumatic system for controlling downstream components of the rail connector assembly, and a busbar assembly for conducting electrical energy along the length of the boom.

In order to operate the mobile machine 140, the mobile machine is controlled by an operator, either remotely or present in the operator cabin 160. Upon approaching the electrically-conducting rail system 120, the rail connector assembly 200 is deployed. This deployment may be the result of the operator initiating the deployment or may occur autonomously via a signal generated due to the mobile machine's geographic location (e.g., a position identified with a global navigation satellite system) and proximity to the rails 122.

Once initiated (either autonomously or by the operator), a signal for deploying the rail connector assembly 200 is sent to the ECM 216, located in the boom 210. Upon receipt of the signal from the mobile machine 140, the ECM 216 generates a command to the hydraulic system 220 to unlock the boom 210 from the frame 150 of the mobile machine 140. Starting in the reservoir 226 of the HPU 222, a hydraulic pump 228 (driven by the motor 230) generates hydraulic pressure, which is directed to the hydraulic manifold 232 to actuate the locking pin 244 from a locked position to an open or free position. The boom 210, while unlocked, remains in a retracted position against the frame 150 of the mobile machine.

Once the ECM 216 receives feedback from the system state sensors 250 that the locking pin 244 has actuated, the ECM generates another command to the hydraulic system 220, instructing the hydraulic system 220 to extend the boom 210 outward from the frame 150 of the mobile machine 140 about the pivot joint 214. The HPU 222 can then generate the appropriate level of pressure to cause the hydraulic cylinder 234 to extend. Since the hydraulic cylinder 234 is attached to the mobile machine 140 at a frame connector 238 and to the boom 210 at a housing connector 240, the extension of the hydraulic cylinder 234 causes the boom 210 to rotate outward from the frame 150. Once the boom 210 has been partially or fully extended, the ECM 216 receives a feedback signal from one or both of a system state sensor 250 and an angle sensor 224. In response to this feedback, ECM 216 generates a cut-off command to the hydraulic system 220 to halt operation.

Following the cut-off command, the ECM 216 receives a command from the operator or an autonomous system to extend the trailing arm assembly 400. In response, the ECM 216 generates a command to the pneumatic system 260 to initiate the extension. In the case of an air-based pneumatic system, air passes through the filter 262 and into an air compressor 264 to be pressurized, and any residual moisture is removed in the dryer 266. In order to extend the trailing arm assembly 400, the pneumatic valve 270 is actuated to release the pressurized air into a plurality of telescoping links (not shown) of the trailing arm assembly 400. The plurality of telescoping links act as a plurality of interlinked piston rods and the pressurized air extends the trailing arm assembly 400 from a collapsed state (not shown) to an extended state (FIG. 1). The trailing arm assembly 400 extends in a vertical direction (towards the ground 10) either while the mobile machine 140 is moving or at rest. The trailing arm assembly 400 then contacts the electrically-conducting rail system 120 and rotates in a rearward direction relative to the direction of travel by the mobile machine 140. The contactor assembly 450 aligns with and connects to the plurality of conductor rails 122.

The contactor assembly 450 and the trailing arm assembly 400 may be retracted either by an express command by the operator or autonomously due to either an issue of aligning the contactor assembly with the conductor rails 122 or the conductor rails failing to provide electrical energy or a proper ground. In order to retract the trailing arm assembly 400, the ECM 216 generates a command to the pneumatic system 260 to actuate a plurality of extendible brushes (not shown) housed within the base of the contactor assembly 450. Once disengaged from the electrically-conducting rail system 120, the ECM generates a pneumatic system command to create a negative pressure on the system and therefore retract the trailing arms.

In accordance with the present disclosure, the pivoting boom for a mobile machine allows for the integration and simplification of several systems in a rugged housing. The pivoting boom is lightweight and can be adapted to any one of a plurality of mobile machines in order to aid with mobile charging. Furthermore, the hydraulic and pneumatic systems of the boom allow for the rapid deployment and engagement of the rail connector assembly onto an electrically-conducting rail system. Finally, the busbar assembly allows for the secure transfer of electrical energy along the length of the boom, ending with the transfer to the battery system of the mobile machine.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A boom for connecting a mobile machine to an electrically-conducting rail system, the boom comprising:
   a housing, the housing pivotally attached to a frame of the mobile machine at a pivot point at a proximal end of the housing;
   a busbar assembly, the busbar assembly attached to an interior surface of the housing and configured to be connected to a plurality of electrical cables that electrically connect the mobile machine to the electrically-conducting rail system via the busbar assembly;
   a hydraulic system, the hydraulic system including a hydraulic power unit, a hydraulic cylinder and a hydraulic manifold; and
   a pneumatic system within the housing.

2. The boom of claim 1, wherein the hydraulic power unit includes a reservoir and a hydraulic pump that is actuated to pivot the boom outward from the mobile machine.

3. The boom of claim 1, further including a locking pin on an exterior surface of the housing at a distal end of the boom, wherein the locking pin is fluidly connected to the hydraulic manifold by an individual hydraulic fluid tube.

4. The boom of claim 3, wherein the locking pin is configured to actuate between an unengaged state and an engaged locking state,
   wherein, when the boom is pivoted outward from the mobile machine, the locking pin is configured to be in an unengaged state, and
   wherein, when the boom is in a retracted state against the frame of the mobile machine, the locking pin is configured to be in an engaged locking state, thereby preventing the boom from pivoting outward from the frame.

5. The boom of claim 1, further including an angle sensor located adjacent to the proximal end of the housing.

6. The boom of claim 1, further including a proximity sensor mounted to a surface of the boom.

7. The boom of claim 1, wherein the busbar assembly further includes a plurality of connection pins for attaching the plurality of electrical cables to the busbar assembly, wherein the plurality of connection pins are secured to the busbar assembly by a plurality of insertion pins.

8. The boom of claim 7, wherein the plurality of insertion pins are configured to fracture along pre-determined points of breakage, thereby preventing damage to the busbar assembly.

9. The boom of claim 1, the pneumatic system including a plurality of pneumatic tubes, an air compressor, an air dryer, a pneumatic tank, and a pneumatic valve.

10. The boom of claim 9, wherein the pneumatic valve controls fluid pressure within the pneumatic system and movement of a trailing arm connected to a distal end of the boom.

11. An electrical power supply system, comprising:
   an electrically-powered mobile machine;
   a boom for electrically connecting the electrically-powered mobile machine to an electrically-conducting rail system, the boom comprising:
      a boom housing defining an interior;
      a first busbar;
      a second busbar, wherein the first busbar and the second busbar are spaced apart by a plurality of housing connectors, the plurality of housing connectors coupling the first busbar and the second busbar to the interior of the boom housing; and
   a plurality of electrical cables, the plurality of electrical cables each including a connection pin connected to the first busbar and the second busbar.

12. The electrical power supply system of claim 11, wherein the connection pin is mechanically crimped onto a length of an individual electrical cable.

13. The electrical power supply system of claim 11, wherein the first busbar and the second busbar each comprise a busbar connection assembly, the busbar connection assembly including a plurality of bore openings configured to receive the connection pin, a plurality of retention slots for retaining the connection pin, and a plurality of frangible retention rods shaped to be retained within the plurality of retention slots.

14. The electrical power supply system of claim 13, wherein each proximal pin includes a distal end, wherein the distal end, when inserted into the busbar connection assembly, aligns with the plurality of retention slots and is shaped to receive a pair of frangible retention rods on opposite sides of the distal end.

15. The electrical power supply system of claim 13, wherein the plurality of frangible retention rods are made of either a plastic or metal material and are configured to strategically fracture along pre-determined points of breakage.

16. The electrical power supply system of claim 11, wherein the first busbar and the second busbar include an insulated or dielectric material.

17. The electrical power supply system of claim 11, wherein a first plurality of electrical cables of the plurality of electrical cables electrically connect the electrically-powered mobile machine to a proximal end of the first busbar and to a proximal end of the second busbar, and a second plurality of the plurality of electrical cables couple to a trailing arm assembly, the trailing arm assembly being electrically connected to the electrically-conducting rail system, at a distal end of the first busbar and a distal end of the second busbar, wherein the plurality of electrical cables conduct electrical energy from the distal ends of the first busbar and the second busbar along a length of the boom and to the electrically-powered mobile machine.

18. A boom fluid system, the boom fluid system comprising:

an electronic control module;

a hydraulic system, the hydraulic system including a hydraulic power unit, a hydraulic manifold, and a hydraulic cylinder connected at a proximal end to a frame of a mobile machine and to an external boom housing at a distal end; and a pneumatic system, the pneumatic system including a filter, a compressor, a dryer, a pneumatic tank, and a pneumatic valve, wherein the electronic control module monitors and controls pressure generated by the hydraulic system and the pneumatic system.

19. The boom fluid system of claim 18, the hydraulic system further including a plurality of hydraulic tubes, wherein the hydraulic power unit, the hydraulic cylinder, and a locking pin are fluidly connected to the hydraulic manifold by the plurality of hydraulic tubes, and wherein the electronic control module initiates fluid movement within the hydraulic system.

20. The boom fluid system of claim 18, the pneumatic system is interconnected by a plurality of pneumatic tubes, wherein the compressor is coupled to the dryer, the dryer is connected to the pneumatic valve and the pneumatic tank, and the pneumatic tank is further connected to the pneumatic valve, and wherein the pneumatic valve is further connected to a trailing arm assembly by a pair of the plurality of pneumatic tubes.

\* \* \* \* \*